United States Patent [19]

Carroll

[11] 4,320,449
[45] Mar. 16, 1982

[54] CONTROL CIRCUIT
[75] Inventor: James C. Carroll, North Huntingdon Township, Westmoreland County, Pa.
[73] Assignee: Westinghouse Electric Corp., Pittsburgh, Pa.
[21] Appl. No.: 182,716
[22] Filed: Mar. 22, 1962
[51] Int. Cl.³ .......................................... H02M 7/515
[52] U.S. Cl. ................................................. 363/135
[58] Field of Search ................ 321/66, 7, 6; 363/135, 363/139

[56] References Cited
U.S. PATENT DOCUMENTS
2,442,261  5/1948  Boyer et al. ........................... 321/66

Primary Examiner—Richard A. Farley
Attorney, Agent, or Firm—D. R. Lackey

EXEMPLARY CLAIM

1. A direct current to alternating current conversion apparatus comprising, a plurality of controlled rectifiers each having a conducting and a non-conducting state, each of said controlled rectifiers having an anode-cathode circuit and a triggering electrode, first means for changing a direct current to a first frequency alternating current, said state of conduction of each of said plurality of controlled rectifiers being determined by a control circuit comprising a phase shifting network connected with and responsive to said first frequency alternating current from said first means, said first frequency alternating current connected with said anode-cathode circuits of said plurality of controlled rectifiers, second means connected to said phase shifting circuit modulating said phase shifted first frequency alternating current at a second frequency alternating current, said modulated first frequency alternating current connected to said plurality of controlled rectifier trigger electrodes so that said controlled rectifiers are rendered conductive in a predetermined sequence to provide an output voltage at said second frequency alternating current.

7 Claims, 11 Drawing Figures

CONTROL CIRCUIT

This invention relates in general to electrical conversion apparatus and more particularly to control circuits for electrical conversion apparatus.

Converters of the prior art conventionally use a plurality of power switches, such as ignitrons or silicon controlled rectifiers, connected in a bridge, or parallel inverter configuration with an appropriate control circuit releasing the power switches in a predetermined sequence to thereby provide an alternating current output from a direct current input. A major problem with inverters of this type is the inability of the inverter to operate into a three-phase reactive load with proper commutation.

Accordingly, it is a general object of this invention to provide a new and improved control circuit for direct current to alternating current converters.

It is a more particular object of this invention to provide a new and improved control circuit for direct current to alternating current conversion apparatus which will provide a substantially sinusoidal three-phase output to reactive loads.

Briefly, the above cited objects are accomplished by providing a direct current to high frequency alternating current inverter, and a cycloconverter to change the high frequency alternating current output from the inverter to the frequency of alternating current desired. In this system the inverter and commutating means are isolated from the load by the cycloconverter. The cycloconverter, with the proper control circuit, will provide a substantially sinusoidal output for either real or reactive loads.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings in which.

Figure 1:
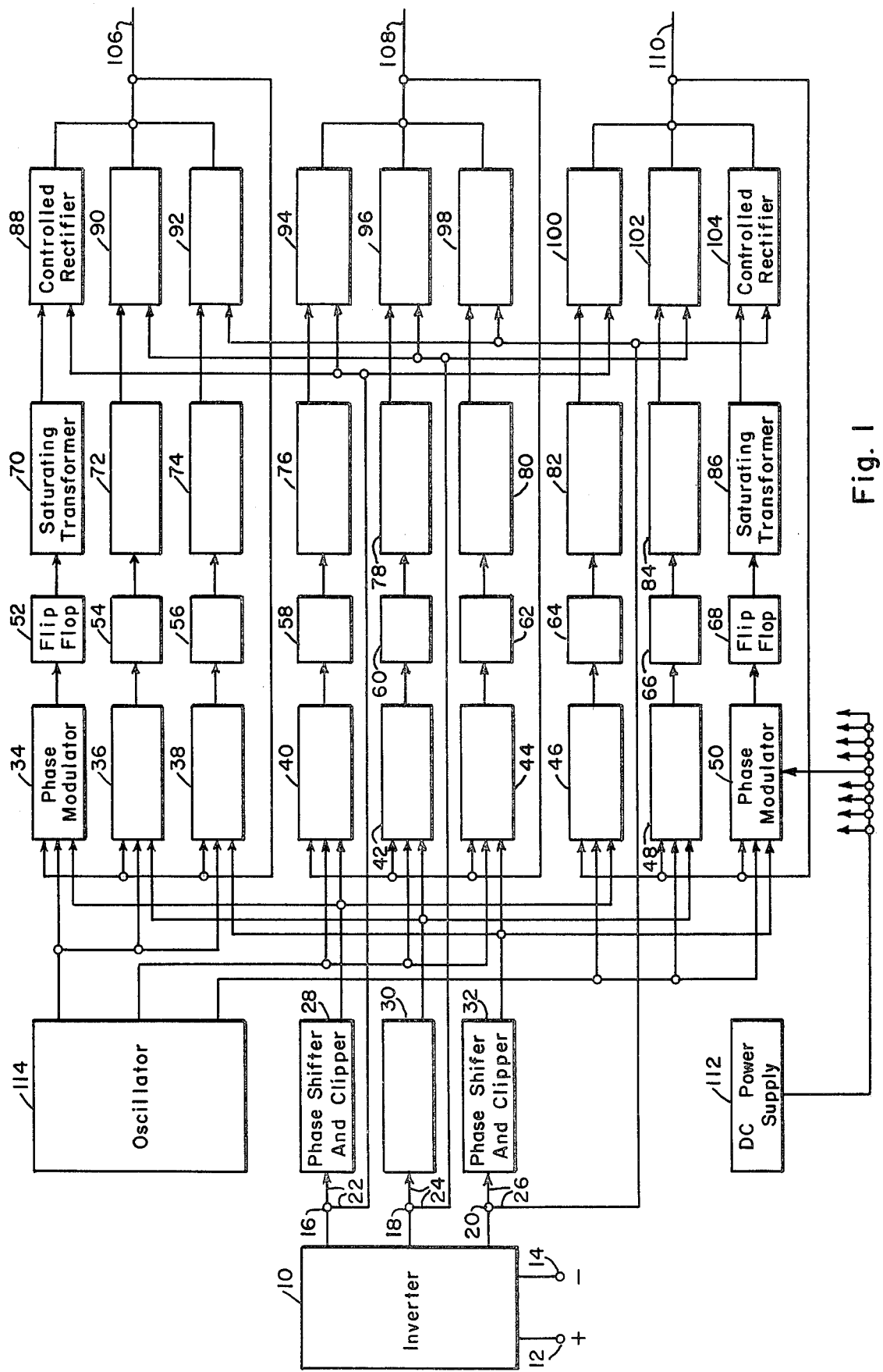
FIG. 1 is a block diagram of an electrical conversion system.

Referring now to the block diagram of FIG. 1, an inverter 10, having direct current input terminals 12 and 14 and alternating current output terminals 16, 18 and 20, is shown. The alternating current output terminals 16, 18 and 20 are connected by conductors 22, 24 and 26 to a plurality of controlled rectifiers which are connected and operated as a cycloconverter. The inverter 10 output terminals 16, 18 and 20 are also connected by conductors 22, 24 and 26 to a control circuit for the cycloconverter.

The control circuit for the cycloconverter comprises three phase shifter and clipper circuits 28, 30 and 32, nine phase modulators 34, 36, 38, 40, 42, 44, 46, 48 and 50, nine bistable trigger circuits 52, 54, 56, 58, 60, 62, 64, 66 and 68, nine saturating transformers 70, 72, 74, 76, 78, 80, 82, 84 and 86 and nine pairs of controlled rectifiers 88, 90, 92, 94, 96, 98, 100, 102 and 104. Three controlled rectifier pairs, for example controlled rectifier pairs 88, 90 and 92 provide one-phase of the three-phase output at conductor 106. A source of direct current power is required by the control circuit and is represented by the block 112. A three-phase oscillator represented by block 114 is provided to supply a modulating signal to the nine phase modulators 34, 36, 38, 40, 42, 44, 46, 48 and 50.

The output voltage wave shape of the cyclo-converter is a substantially sinusoidal three-phase alternating current wave, having a frequency lower than the input voltage frequency. The control circuit provides a signal to each trigger or gate electrode of the controlled rectifiers of the cycloconverter in a predetermined sequence, so that when the high frequency three-phase alternating current potential from the inverter impressed across the anode-cathode circuit of each controlled rectifier is at a predetermined magnitude and polarity, that controlled rectifier will conduct. The controlled rectifiers are rendered conductive in such a manner that a three-phase alternating current, appearing at conductors 106, 108 and 110, is fabricated from segments of the high frequency three-phase alternating current potential from the inverter 10 impressed on the anode-cathode circuit of the controlled rectifiers. The alternating current output voltage at conductors 106, 108 and 110 has an average value that varies at a substantially sinusoidal rate.

Figure 4A:
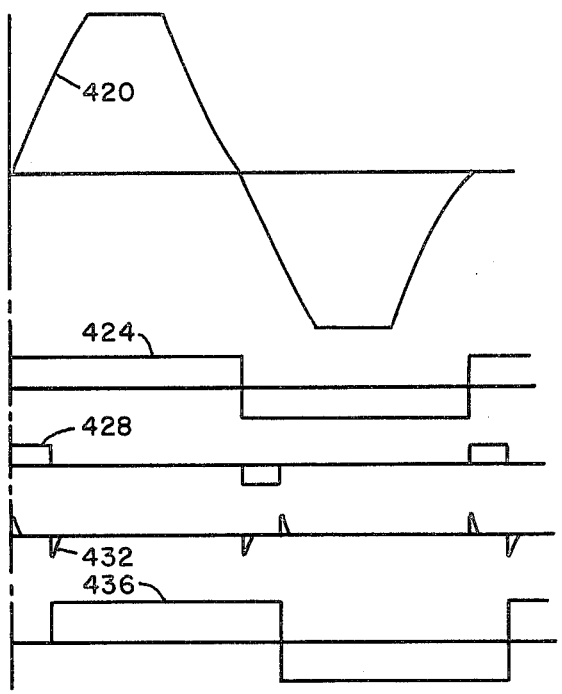
Figure 4B:
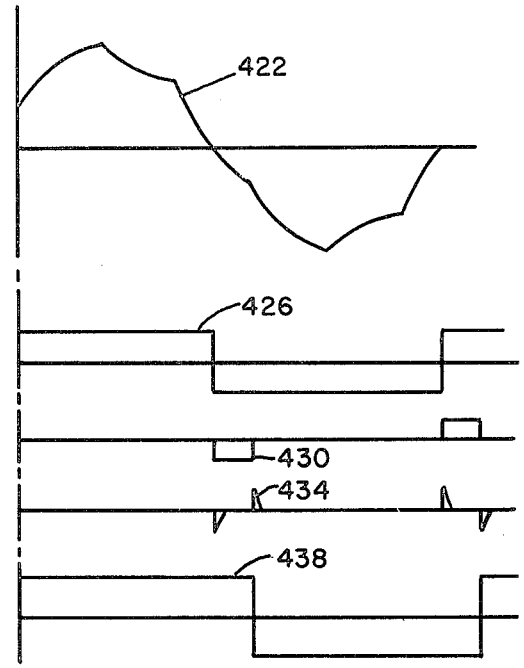

Referring now to the schematic diagram of FIG. 2, the input to the cycloconverter control circuit is provided through limiting resistors 116 and double anode Zener diodes 118 to the phase shifting and clipping circuits 28, 30 and 32, from a three-phase alternating current source, such as the controlled rectifier bridge inverter 10. The wave shape of this inverter output voltage varies in accordance with the ratio of real to reactive power required by the load on the inverter. The curves 420 and 422 of FIG. 4A and FIG. 4B, respectively, are examples of the inverter 10 output with real to reactive power load ratios of 1.51 and 0.565, respectively. Each phase of the inverter output provides a signal to one of the phase shifter and clipper circuits 28, 30 and 32, as shown in FIG. 2A. The signal applied to the phase shifting circuits 28, 30 and 32 is clipped or regulated by the Zener diodes 118.

In the interest of simplicity and due to the fact all the phase shifting circuits 28, 30 and 32 are alike only one is shown and described in detail.

The control circuit input signal, after it is limited or clipped by the Zener diodes 118, is coupled by transformer 120 through resistors 122 and 124 to the bases b of transistors 126 and 128, respectively. The transistors 126 and 128 are connected and operated as a bistable trigger circuit 125 that requires a very low value of input signal voltage to change the state of conduction of the transistors 126 and 128. The output voltage of the trigger circuit is a square wave that is substantially in phase with the inverter 10 output voltage. The square wave output voltage of the trigger circuit is shown as curves 424 and 426 of FIG. 4A and FIG. 4B, respectively. Due to the fact the waveform, magnitude and phase position of the inverter 10 output voltage varies from cycle to cycle, in accordance with the ratio of real to reactive power required by the inverter load, the only intelligence from the inverter voltage wave available to drive the cycloconverter control circuit is the voltage zero crossing of the inverter 10 output voltage. This requires the transistors 126 and 128 to change their state of conduction at a very low level of signal voltage to have an output voltage in phase with the inverter 10 voltage under all load conditions.

A primary winding 130 of a saturating transformer 132 is connected in series with resistors 133 and 135 across the collectors c of the transistors 126 and 128. A potentiometer 134 connected in parallel circuit relationship with the primary winding 130 varies the voltage to the primary winding 130 which varies the angle of saturation of the saturating transformer 132 from approximately 20° to 40°. Since a 60° phase delay at the gate of the controlled rectifier is required to release the controlled rectifier at the required angle of anode-cathode voltage the potentiometer 134 is adjusted so that the transformer 132 provides a 30° delay. An additional 30° delay is provided in the transformer connections. That is, the anode-cathode circuits of each of the controlled rectifiers of the cycloconverter are connected in pairs in series circuit relationship across line to line of the inverters output voltage. Each controlled rectifier sees line to neutral voltage from anode to cathode and the voltage input to the phase shifters 28, 30 and 32 is taken from line to line of the delta connected transformers 120. This, of course, provides a 30° phase delay which combines with the 30° delay provided by the phase shifting circuits to cause the necessary 60° delay between anode-cathode voltage and gate voltage of the controlled rectifiers of the cycloconverter. The square pulse output of the saturating transformer 132 is shown as curves 428 and 430 of FIGS. 4A and 4B, respectively.

The secondary winding 136 of the saturating transformer 132 is connected through a resistor 138 and a capacitor 140, to the bases b of transistors 142 and 144. The square pulse output from the saturating transformer 132 is connected to a differentiating circuit comprising resistor 138 and capacitor 140 to provide a current pulse each time the square pulse input changes. The current pulse triggers an amplifying bistable trigger circuit 146, comprising the transistors 142 and 144. The current pulse output from the shaping network is shown by curves 432 and 434 of FIGS. 4A and 4B, respectively.

The trigger circuit 146 transistors 142 and 144 change their state of conduction on every other pulse from the shaping network. As can be seen from FIGS. 4A and 4B curves 432 and 434, respectively, the pulse train comprises two positive then two negative pulses. However, the transistors 142 and 144 switch, or change their state of conduction, on the first pulse of each polarity rendering the second pulse of the same polarity ineffective. As can be seen from the curves 432 and 434 of FIGS. 4A and 4B, respectively, the pulses which are effective to change the state of conduction of transistors 142 and 144 lag the square wave of curves 424 and 426, respectively, by the length of time required for the saturable transformer 132, shown as curves 428 and 430 of FIGS. 4A and 4B, to saturate. The width of the pulses of curves 428 and 430 is determined by the setting of potentiometer 134 and is in the instant case 30°. Curves 436 and 438 of FIGS. 4A and 4B, respectively, show the trigger circuit 146 output voltage wave, phase shifted by the width of the square pulses of curves 428 and 430.

Figures 4C, 4D, 4E:
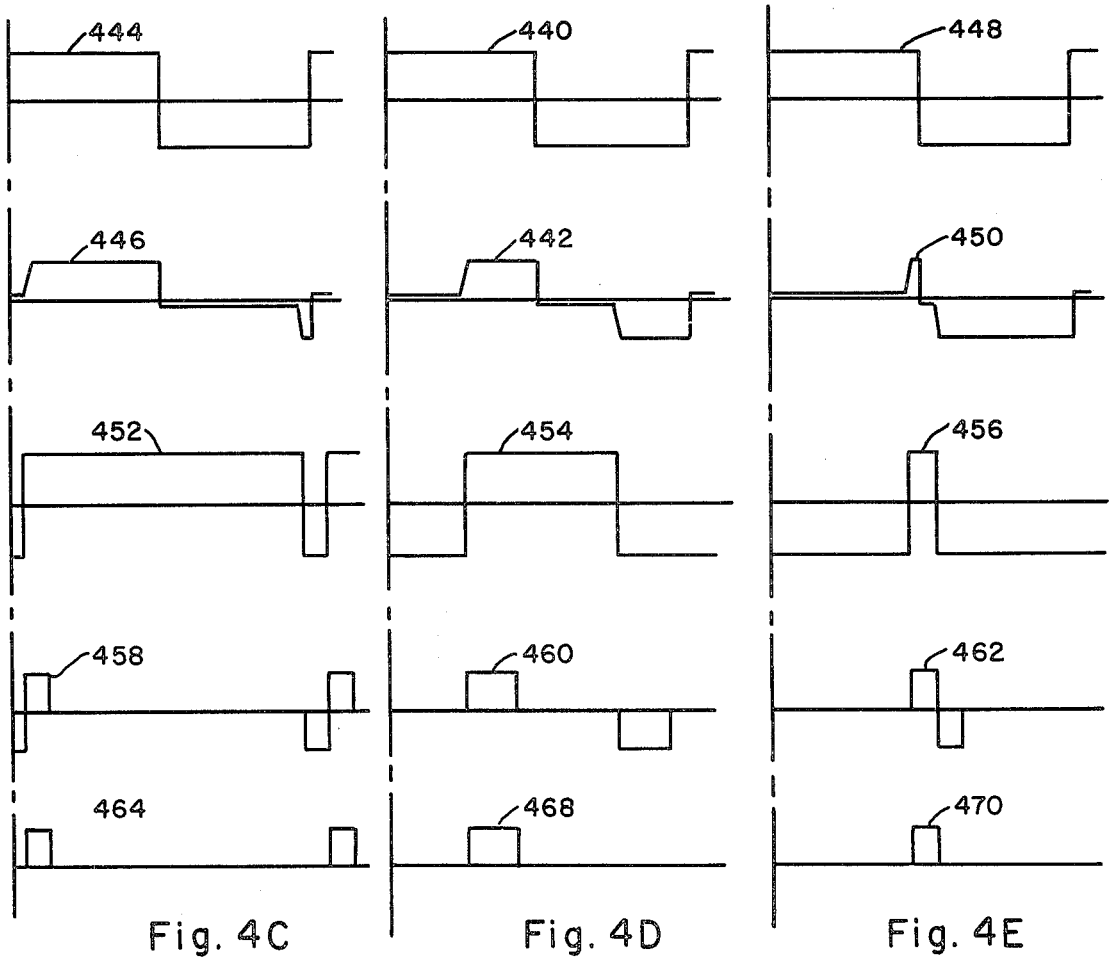

The square wave output from amplifier 146 is applied to the primary winding 148 of a transformer 150. The output voltage waveform of amplifier 146 is shown as curves 436 and 438 of FIGS. 4A and 4B, respectively. The secondary windings 152, 154 and 156 are connected to the load windings 158 and 160, 162 and 164 and 166 and 168, respectively, of the magnetic phase modulators 34, 40 and 46, respectively. Each magnetic pulse modulator 34, 40 and 46 has two bias windings 170 and 172, 174 and 176 and 178 and 180, respectively, and two control windings 182 and 184, 186 and 188 and 190 and 192, respectively, in addition to the load windings 158 and 160, 162 and 164 and 166 and 168, respectively. The bias windings 170 and 172, 174 and 176 and 178 and 180 have a direct current voltage applied thereto, provided by power supply 112, that causes the magnetic phase modulators 34, 40 and 46 to saturate at 90° or at the middle of the input square wave. FIG. 4D shows the square wave output of trigger circuit 146 as curve 440. Curve 442 of FIG. 4D shows the magnetic phase modulator output voltage with the bias voltages applied being of such a magnitude to cause the magnetic modulator to saturate after 90° of the square wave input signal 440 has been applied.

The control windings 182 and 184, 186 and 188 and 190 and 192 have an alternating current signal, having a frequency equal to the desired frequency of the cycloconverter output voltage, applied thereto. The alternating current signals are provided by a three-phase oscillator 114. The magnitude and polarity of the control winding signals vary the angle at which the magnetic phase modulators saturate. That is, the magnetic phase modulators saturate at an angle above or below the reference 90° delay, set by the direct current bias voltage, in accordance with the magnitude and polarity of the alternating current signals applied to the control windings 182, 184, 186, 188, 190 and 192 from oscillator 114. The magnitude of the alternating current signal provided by oscillator 114 to the control windings 182, 184, 186, 188, 190 and 192 is varying at a sinusoidal rate.

Curves 444 and 448 of FIGS. 4C and 4E, respectively, shows the square output wave of the trigger circuit 146. Curve 446 of FIG. 4C shows the shape of the magnetic phase modulator output voltage with a positive potential applied to the control windings. That is, the maximum positive value of the sine wave applied to the control windings. Curve 450 of FIG. 4E is the magnetic phase modulator output wave shape with a negative potential applied to the control winding of the magnetic phase modulator. That is, the maximum negative value of the sine wave applied to the control winding. In the present invention the wave form of the output voltage from the magnetic phase modulator would oscillate at a sinusoidal rate from the positive value shown as curve 446 of FIG. 4C through the zero control signal value of curve 442, FIG. 4D to the negative control signal value of curve 450 shown in FIG. 4E, in accordance with the sine wave impressed on the modulator control windings.

Figure 2A:
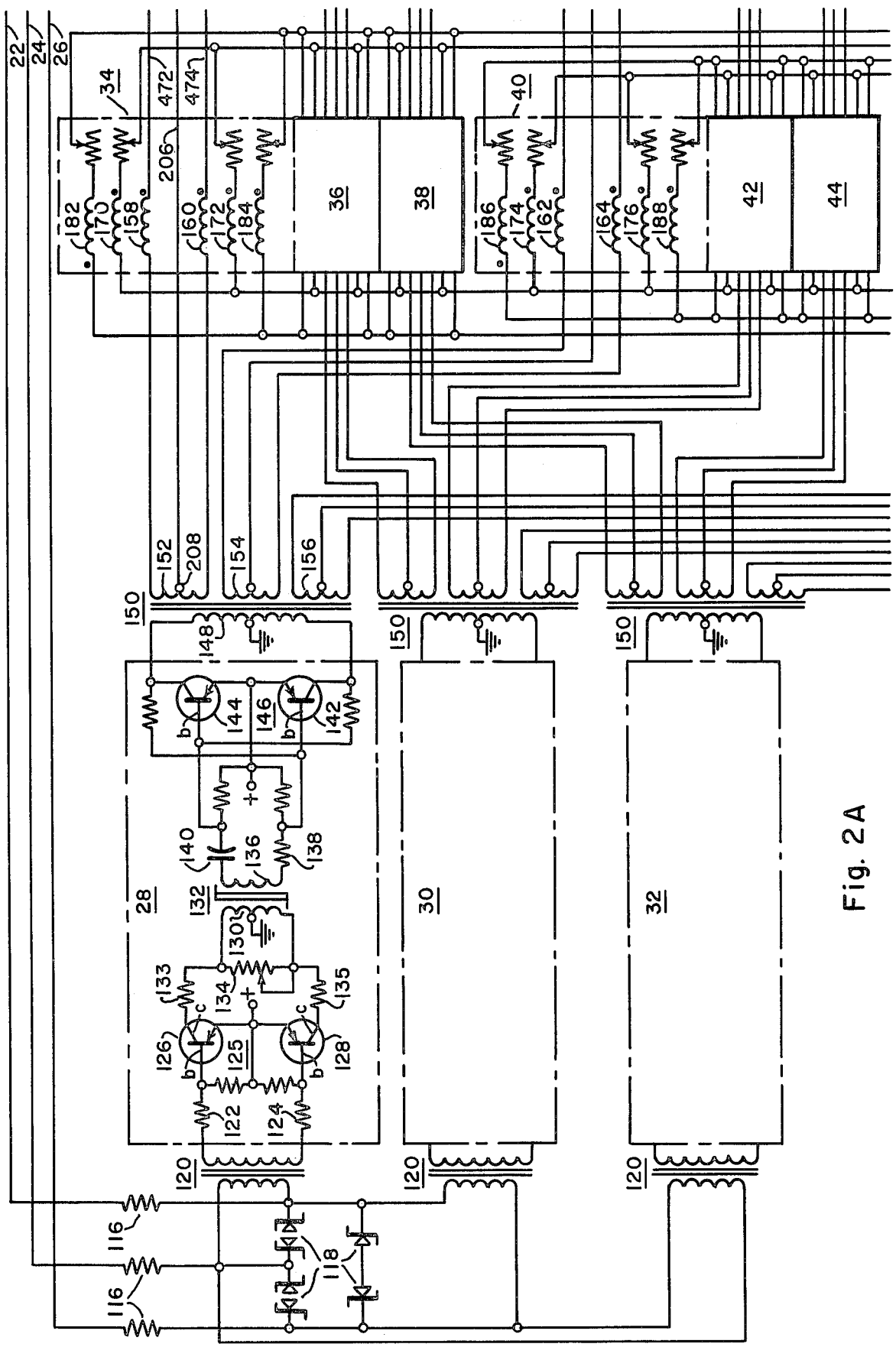
FIG. 2A is the upper left quadrant of a wiring schematic of a conversion system.
Figure 2B:
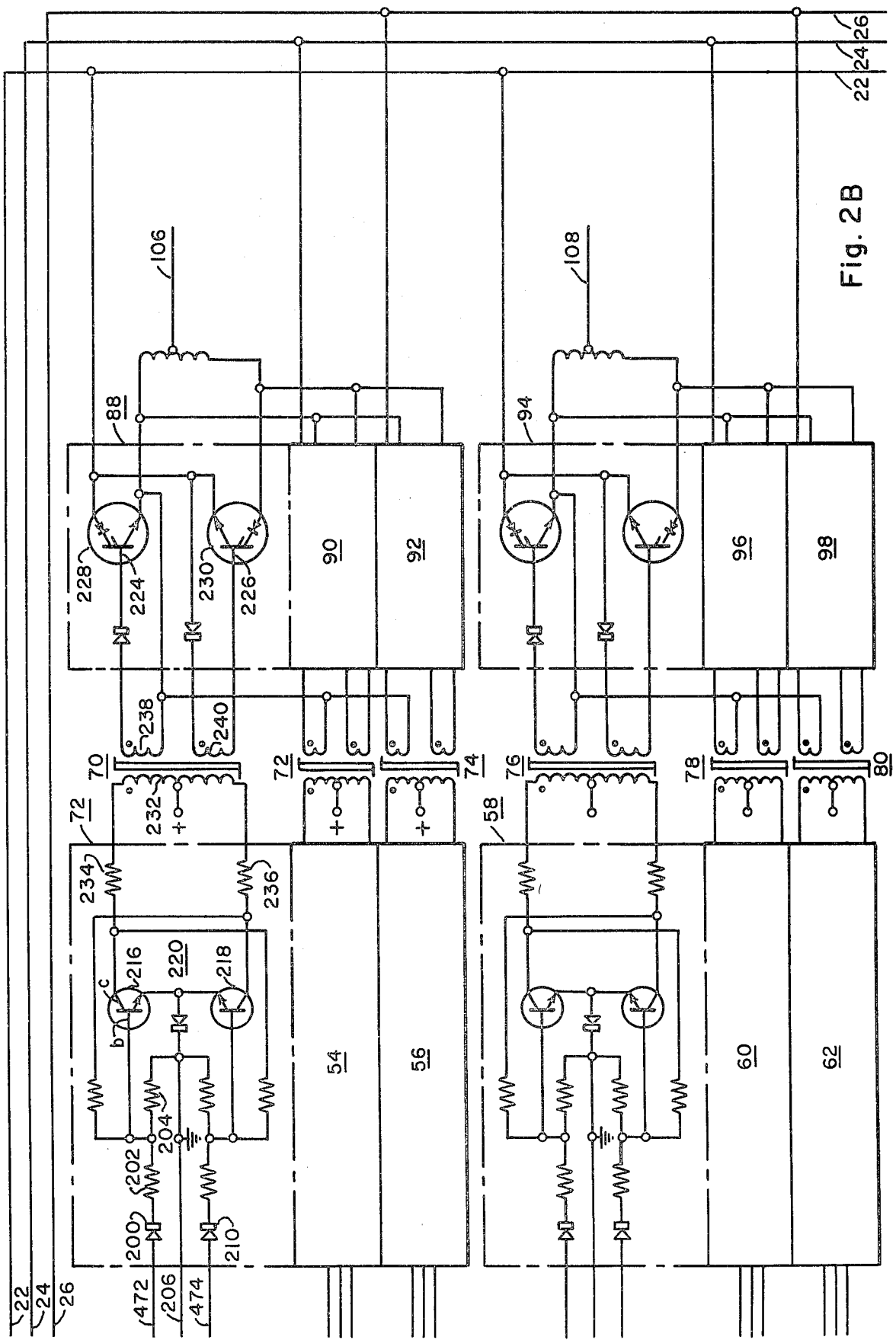
FIG. 2B is the upper right quadrant of the wiring schematic of a conversion system.
Figure 2C:
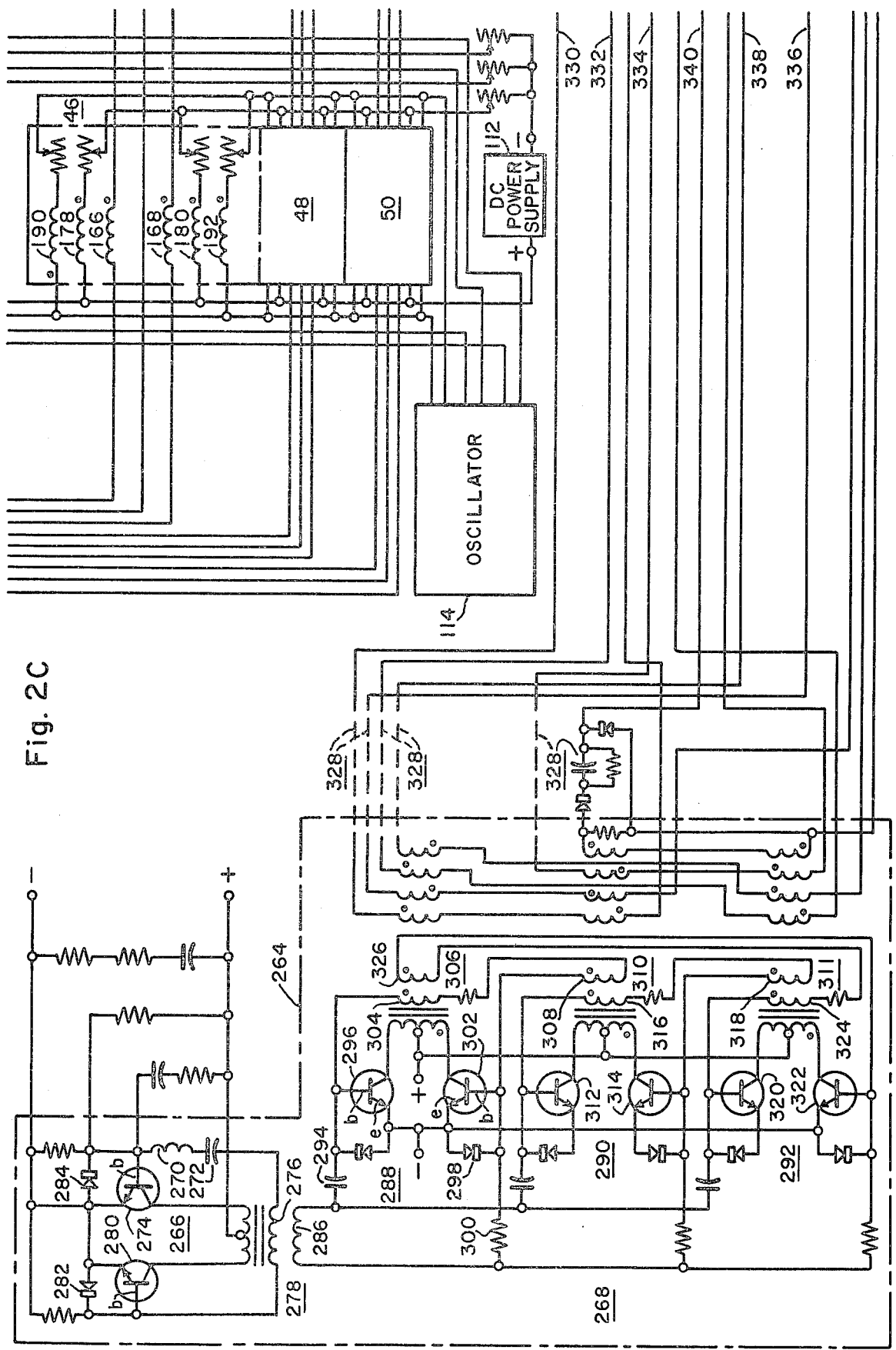
FIG. 2C is the lower left quadrant of a wiring schematic of a conversion system.

A source of direct current voltage 112 is shown in FIG. 2C connected to the bias windings of the magnetic phase modulator. A source 114 of three-phase alternating current signals is shown in FIG. 2C with each phase, of the three-phase alternating current output, connected to the control windings of three of the nine magnetic phase modulators.

The magnetic phase modulators are operated similar to a magnetic amplifier doubler circuit except one control winding is magnetically opposed to the other control winding, for example winding 182 of modulator 34, is magnetically opposed to control winding 184 of modulator 34. Therefore, if a positive signal from transformer 150 secondary winding 152 is impressed on load winding 158 and a positive signal from oscillator 114 is impressed on control winding 182 the saturation of core one of magnetic phase modulator 34 will be delayed, less than the 90° delay due to the direct current voltage of the bias winding 170, because the control winding 182 and the bias winding 158 are magnetically opposing each other therefore requiring less volt-seconds of the load winding voltage to reach the volt-seconds necessary for saturation of core one. This condition is shown by the group of wave shapes of FIG. 4C. During the half cycle just described, current flows from transformer 150, secondary winding 152 through load winding 158 of magnetic phase modulator 34, diode 200, resistors 202 and 204, and conductor 206 to a center tap 208 of the transformer 150 secondary winding 152. Current flow through the load winding 160 of magnetic phase modulator 34 is blocked by diode 210. When the polarity of the square wave signal from transformer 150 secondary winding 152 applied to the load windings 158 and 160 of magnetic phase modulator 34 reverses, current flow in load winding 158 is blocked by diode 200 and core one of magnetic phase modulator 34 is driven out of saturation by an amount proportional to the summation of the flux induced by the control and bias windings. However, when the input signal voltage to the load windings 158 and 160 reverses the current flows through magnetic phase modulator 34 load winding 160. The lower portion of magnetic phase modulator 34 has control winding 180, and bias winding 160 magnetically aiding each other to thereby require a relatively longer time to attain the required volt-seconds for saturation of core two. The signal voltage output from magnetic phase modulator 34, impressed on the bases b of transistors 216 and 218, respectively, is an unsymmetrical wave having a long duration pulse of one polarity and a short duration pulse of the opposite polarity varying in accordance with the sine wave impressed on the modulator control winding. The wave shape of the signal applied to the bases b of transistors 216 and 218 will vary at a sinusoidal rate from the curve 446 of FIG. 4C through curve 442 of FIG. 4D to curve 450 of FIG. 4E. The unsymmetrical wave output from magnetic phase modulators may be sufficient to drive a low power cycloconverter. However, when supplying series-parallel combinations of controlled rectifiers for higher power applications larger amounts of power are required to trigger, or gate the controlled rectifiers and a steeper wave front trigger pulse is required to insure simultaneous triggering, or gating of the controlled rectifiers. Therefore, the magnetic phase modulator output signal is electrically connected to the input of an amplifying bistable trigger circuit 220 which provides a steep front pulse of sufficient power to insure simultaneous releasing of a plurality of series-parallel connected controlled rectifiers.

The bistable trigger circuit 220 amplifies the wave and also provides a steeper slope on the leading edge of the square wave to thereby insure simultaneous releasing of the appropriate rectifiers in applications having a plurality of controlled rectifiers connected in series-parallel configurations. Curves 452, 454 and 456 of FIGS. 4C, 4D and 4E, respectively, show the trigger circuit 220 output voltage for a positive, zero and negative, respectively, value of control winding signal applied to the magnetic phase modulators. The amplified unsymmetrical square wave from the bistable trigger circuit 220 is coupled by a saturating transformer 70 to the bases or gate electrodes 224 and 226 of controlled rectifiers 228 and 230 which make up one rectifier pair 88 of the nine controlled rectifier pairs connected and operated as a three-phase cycloconverter.

The primary winding 232 of saturating transformer 70 is connected through limiting resistors 234 and 236 to the collectors c of transistors 216 and 218, respectively. The secondary windings 238 and 240 of the saturating transformer 70 are connected to the bases or gate electrodes 224 and 226 of controlled rectifiers 228 and 230, respectively. The two controlled rectifier pairs 90 and 92 in cooperation with controlled rectifier pair 88 provides one phase of the three-phase alternating current output from the cycloconverter at conductor 106. Curves 458, 460 and 462 of FIGS. 4C, 4D and 4E, respectively, are the saturable transformer secondary winding voltage wave forms for a positive, zero and negative, respectively, value of magnetic phase modulator control winding signal. Curves 464, 468 and 470 of FIGS. 4C, 4D and 4E, respectively, are the voltage pulses impressed on the gate electrode of the controlled rectifiers of the cycloconverter when the control winding of the magnetic amplifiers has a positive, zero and negative, respectively, voltage applied thereto.

As can be seen from the drawings each phase of the high frequency three-phase inverter 10 output is associated with all three phases of the three-phase alternating current cycloconverter output. That is, each phase of the three-phase cycloconverter output is fabricated from segments of the voltage wave of all three phases of the inverter 10 output.

Figure 2D:
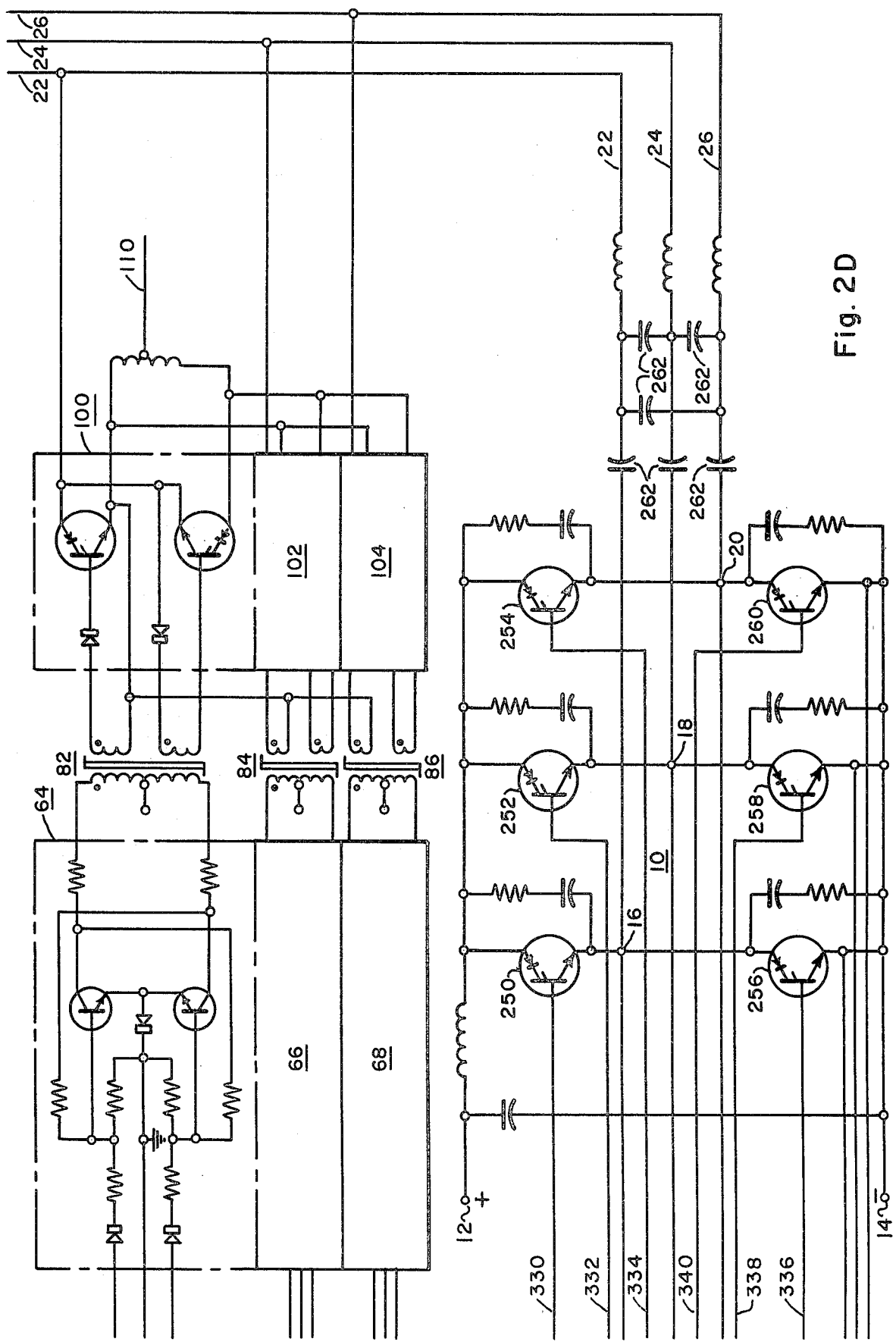
FIG. 2D is the lower right quadrant of a wiring schematic of a conversion system.

A source of three-phase alternating current is supplied to the input of the cycloconverter control circuit and the anode-cathode circuit of the cycloconverter from any convenient source, for example, the three-phase bridge inverter 10 as shown schematically in FIG. 2D. The inverter 10 shown schematically in FIG. 2D is comprised of controlled rectifiers 250, 252, 254, 256, 258 and 260, and commutating capacitors 262. A three-phase oscillator 264 is provided as a control circuit causing the controlled rectifiers 250, 252, 254, 256, 258 and 260 of the inverter 10 to conduct in a predetermined sequence to thereby provide a high frequency three-phase alternating current output at terminals 16, 18 and 20.

The three-phase oscillator 264 shown in FIG. 2C comprises a master oscillator 266 and a phase switching circuit 268. The master oscillator 266 is an L-C feedback control oscillator, the frequency of which is controlled by the resonant frequency of the inductor 270 and the capacitor 272. The L-C circuit has one end connected to the base b of a transistor 274. The other end of the L-C circuit is connected through a feedback winding 276 of an output transformer 278 to the base b of a transistor 280. The transistors 274 and 280 are switched on and off in accordance with the resonant frequency of the L-C circuit comprising coil 270 and capacitor 272. That is, when the current flows from the coil 270 and capacitor 272 through the base-emitter circuit of transistor 274, diode 282 and the feedback coil 276 of transformer 278, the transistor 274 is turned on and the transistor 280 is turned off. When the current reverses direction in the coil 270 and capacitor 272, in accordance with the resonant frequency of that circuit, the current flows through the feedback coil 276 of transformer 278, the base-emitter circuit of transistor 280 and diode 284 which turns on transistor 280 and turns off transistor 274 thereby providing a square wave output voltage at the transformers 278 secondary 286 at the frequency of operation of oscillator 266.

The square wave output signal of the master oscillator 266 is coupled by transformer 278 to the input of the phase switching circuit 268. The phase switching circuit 268 comprises three single-phase oscillators 288, 290 and 292. The output from each of the oscillators 288, 290 and 292 is a single-phase square wave having a frequency equal to one-third of the frequency of operation of the master oscillator 266. A phase angle of exactly 120° exists between each oscillator 288, 290 and 292 of the phase switching circuit 268.

The operation of the three single-phase oscillators is similar to the operation of the master oscillator 266. That is, when the potential at the secondary of transformer 278 is such that a positive potential appears at the right end of the secondary winding 286 of transformer 278, the current flows through capacitor 294, the base b-emitter e circuit of the transistor 296, diode 298 and resistor 300 to the left or negative end of the output winding 286 of transformer 278. The capacitor 294 and resistor 300 shape the square wave output from transformer 278 to a short duration steep front current pulse which is applied to the bases b of the transistors 296 and 302. A feedback winding 304 of transformer 306 provides in-phase current which tends to hold transistor 296 in the conducting state. A second feedback signal voltage, having a smaller magnitude than the first mentioned feedback voltage, is provided from winding 308 of transformer 310 of oscillator 290 and is subtracted from the signal from winding 304 in such a manner that the total feedback signal from the windings 304 and 308 of transformers 306 and 310, respectively, is greater than the signal from the master oscillator 266. However, because the oscillators 288 and 290 have a 120° phase difference between them, the two feedback signals from windings 304 and 308 have a 120° phase difference between them, and the reversal of the polarity of the square wave signal from one feedback winding, for example winding 308, reduces the total feedback voltage from the windings 308 and 304 to a value less than the signal from the oscillator 266. With this reduced value of feedback voltage impressed on the transistors 296 and 302, the signal pulse from the master oscillator 266 will switch the state of conduction of the transistors 296 and 302. That is, transistor 296 is turned off and transistor 302 is turned on. When transistor 302 turns on, the polarity of the signal from winding 304 of transformer 306 is opposite the polarity of the signal from winding 308 of transformer 310 for the next 120° so that the total feedback signal is again greater in magnitude than the pulses from oscillator 266, so the pulse from oscillator 266 is of insufficient magnitude to switch the state of conduction of the transistors 296 and 302 for the next 120°.

The operation of the other two oscillators 290 and 292 of the phase switching circuit 268 is similar to the operation of the described oscillator 288. That is, the state of conduction of transistors 312 and 314 is determined by the signal from oscillator 266 and the two feedback signals from the windings 316 and 318 of oscillators 290 and 292, respectively. The state of conduction of transistors 320 and 322 is determined by the sum of the signals from the master oscillator 266 and the feedback windings 324 and 326 of oscillators 292 and 288, respectively.

Each oscillator 288, 290 and 292 output transformer 306, 310 and 311 has a multi-winding secondary. The voltage from one secondary winding of one phase is subtracted from the voltage of one of the secondary windings of a second phase. The result of combining the oscillator output voltages in this manner is an alternate positive and negative square pulse at 120° intervals each having a 60° duration. The square pulses are connected through pulse shaping networks 328 to the gates of the silicon controlled rectifiers 250, 252, 254, 256, 258 and 260 of the inverter 10 by conductors 330, 332, 334, 336, 338 and 340, respectively, to thereby control the conduction of the controlled rectifiers in a predetermined sequence.

The output voltage from the inverter 10 will vary in phase angle, wave shape and magnitude in accordance with the ratio of real to reactive power required by the load on the inverter 10. Therefore, the polarity or zero voltage crossing of the inverter output voltage is used to control the switching circuit 125 that will switch at a very low level of signal input voltage to provide a square wave output that is substantially in-phase with the inverter output voltage.

Figure 3:
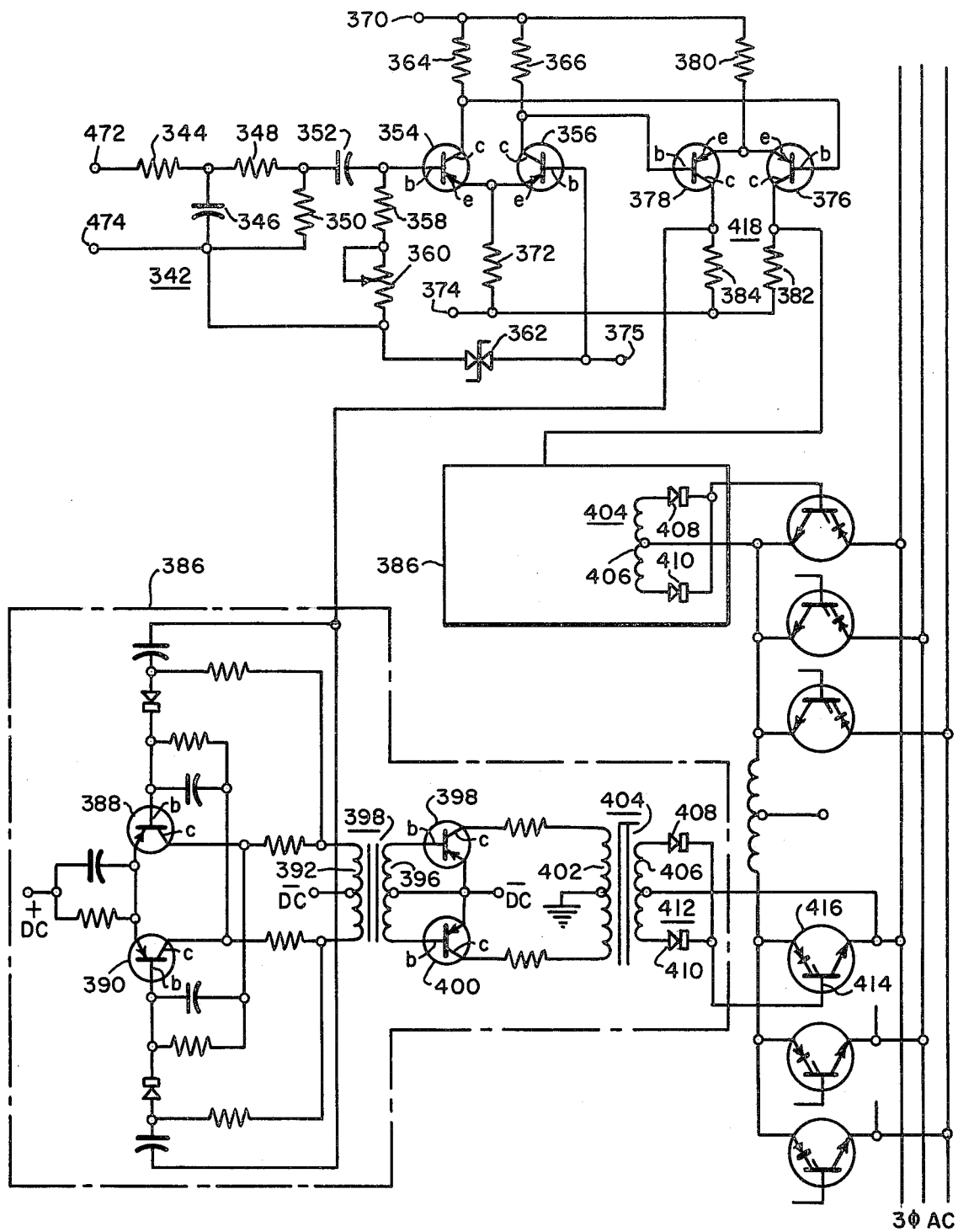
FIG. 3 is a wiring schematic of a modified embodiment of the conversion system; and, FIGS. 4A through 4E are views of the wave shapes appearing in the control circuit of the conversion system.

FIG. 3 is a schematic diagram of a transistor phase modulating circuit. The circuit of FIG. 3 may be substituted for the magnetic phase modulating circuit of FIG. 2A if a wider range of phase modulation is desired.

The square wave output of the trigger circuit 146 of FIG. 2A is connected to an integrating circuit 342, at terminals 472 and 474. The resistor 344 and capacitor 346 integrate the square wave to provide a triangular wave output. The resistors 348 and 350 connected to the capacitor 346 of the integrating circuit act as a voltage divider to attenuate the triangular wave to the desired magnitude. The attenuated triangular wave is capacitively coupled, to the bases b of transistors 354 and 356 by capacitor 352. The resistors 358 and 360 provide for biasing transistors 354 and 356. The double anode Zener diode 362 is connected in series with the resistor 358 and 360 across the bases b of transistors 354 and 356. The collectors c of the transistors 354 and 356 are connected through limiting resistors 364 and 366 to a positive direct current supply connected at terminal 370. Similarly, resistor 372 is connected between the emitters e and a negative direct current supply, connected at terminal 374, to limit the emitter-collector current to a predetermined value.

The state of conduction of the transistors 354 and 356 is determined by the voltage at the bases b. That is, the transistor, for example, transistor 354 with the higher positive potential impressed thereon will be conducting and the other transistor for example, transistor 356 will be non-conductive. The voltage impressed on the base b of transistor 354 is of course varying in accordance with the triangular wave output of the integrating circuit 342. The triangular wave has a frequency equal to the frequency of the inverter 10. The base b of transistor 356 has a sinusoidal voltage thereon that has a frequency of oscillation equal to the desired frequency output of the cycloconverter. The sinusoidal voltage is applied to the base b of transistor 356 at terminal 375.

The ratio of the duration of conduction of the two transistors 354 and 356 varies sinusoidally in accordance with the sine wave voltage applied to base b of transistor 356 through terminal 375. For example, when the sine wave voltage at base b of transistor 356 is zero the two transistors 356 and 358 will each conduct for an equal period of time. When the sine wave voltage at the base b of transistor 356 is positive the transistor 356 will conduct for a longer period of time than transistor 354. When the sine wave signal to the base b of transistor 356 is negative the transistor 356 will conduct for a shorter period of time than transistor 354.

The collectors c of transistors 354 and 356 are connected to the bases b of transistors 376 and 378, respectively. The transistors 376 and 378 operating as an amplifier, also provides a substantially vertical leading and trailing edge output wave at the same frequency and phase angle as the modulator signal provided at terminal 375. The emitters e of transistors 376 and 378 are connected through a current limiting resistor 380 to the positive direct current input terminal 370. The collectors c of transistors 376 and 378 are connected through resistors 382 and 384, respectively, to the negative direct current terminal 374.

Each of the collectors c of transistors 376 and 378 is connected to a bistable trigger circuit 386. The trigger circuit 386 is designed to stop conduction of one transistor, for example, transistor 388 and start conduction of the non-conducting transistor, for example, transistor 390, each time a positive going signal voltage is applied to the bases b of transistors 388 and 390. The collectors c of the transistors 388 and 390 are connected to the primary winding 392 of output transformer 394. The secondary winding 396 of transformer 394 is connected to the bases b of transistors 398 and 400 which are operated as a power amplifier. The collectors c of the transistors 398 and 400 of the power amplifier are connected to the primary winding 402 of a saturable output transformer 404.

The saturable transformer 404 saturates after approximately 60° of the applied square wave thereby providing a pulse of 60° duration which is required to trigger the controlled rectifiers of the cycloconverter. The secondary winding 406 of the saturating transformer 404 is connected to the anodes of a pair of diodes 408 and 410 operating as a full wave rectifier or frequency doubler 412. Since the bistable trigger circuit 386 has an output frequency equal to one-half the input frequency due to the fact the transistors 388 and 390 switch or change their state of conduction on the positive going pulses only, the rectifier 412 is required to double the trigger circuit 386 output frequency to make it equal to the trigger circuit 386 input frequency.

The cathodes of the diodes 408 and 410 are connected to the gate or control electrode 414 of the controlled rectifier 416 to thereby provide the required trigger pulse to controlled rectifier 416.

A trigger circuit exactly like the one indicated at 386 is required for each of the controlled rectifiers of the cycloconverter. Two trigger circuits 386 are driven by each amplifier 418 as indicated in FIG. 3 at 386.

The circuit of FIG. 3 is the preferred embodiment of this invention when a wide range of modulation is required. In this circuit a full 60° pulse can be provided to the control electrode of the controlled rectifier at substantially any angle of delay from 0° to 180°. The circuit of FIG. 2 is less complex and is the preferred embodiment when the required range of delay of firing the controlled rectifiers of the cycloconverter is from approximately 30° to 150°.

While there have been shown and described what are at present considered to be the preferred embodiments of the invention, modifications thereto will readily occur to those skilled in the art. It is not desired, therefore, that the invention be limited to the specific arrangements shown and described and it is intended to cover in the appended claims all such modifications as fall within the true spirit and scope of the invention.

I claim as my invention:

1. A direct current to alternating current conversion apparatus comprising, a plurality of controlled rectifiers each having a conducting and a non-conducting state, each of said controlled rectifiers having an anode-cathode circuit and a triggering electrode, first means for changing a direct current to a first frequency alternating current, said state of conduction of each of said plurality of controlled rectifiers being determined by a control circuit comprising a phase shifting network connected with and responsive to said first frequency alternating current from said first means, said first frequency alternating current connected with said anode-cathode circuits of said plurality of controlled rectifiers, second means connected to said phase shifting circuit modulating said phase shifted first frequency alternating current at a second frequency alternating current, said modulated first frequency alternating current connected to said plurality of controlled rectifier trigger electrodes so that said controlled rectifiers are rendered conductive in a predetermined sequence to provide an output voltage at said second frequency alternating current.

2. A direct current to alternating current conversion apparatus comprising, a plurality of controlled rectifiers each having a conducting and a non-conducting state, each of said controlled rectifiers having an anode-cathode circuit and a triggering electrode, first means changing a direct current to a first frequency alternating current, said state of conduction of each of said plurality of controlled rectifiers being determined by a control circuit comprising a phase shifting network connected with and responsive to said first frequency alternating current from said first means, said first frequency alternating current connected with said anode-cathode circuit of said plurality of controlled rectifiers, a source of second frequency alternating current, a magnetic amplifier circuit connected to said phase shifting circuit and said source of second frequency alternating current thereby magnetically phase modulating said first frequency alternating current at said second frequency alternating current, said modulated first frequency alternating current connected to said plurality of controlled rectifier triggering electrodes so that said controlled rectifiers are rendered conductive in a predetermined sequence to thereby provide an output voltage at said second frequency alternating current.

3. A direct current to alternating current conversion apparatus comprising, a plurality of controlled rectifiers each having a conducting and a non-conducting state, each of said controlled rectifiers having an anode-cathode circuit and a triggering electrode, first means changing a direct current to a first frequency alternating current, said state of conduction of each of said plurality of controlled rectifiers being determined by a control circuit comprising a phase shifting network connected with and responsive to said first frequency alternating current from said first means, said first frequency alternating current connected with said anode-cathode circuit of said plurality of controlled rectifiers, a source of second frequency alternating current, a magnetic phase modulator having two load windings and two control windings, said magnetic phase modulator control windings connected in magnetic opposition to each other, said magnetic phase modulator load windings electrically connected to said phase shifting circuit, said control windings connected to said source of second frequency alternating current so that said magnetic phase modulator phase modulates said first frequency alternating current from said phase shifter at said second frequency alternating current, said modulated first frequency alternating current connected to said plurality of controlled rectifier triggering electrodes so that said controlled rectifiers are rendered conductive in a predetermined sequence to thereby provide an output voltage at said second frequency alternating current.

4. A direct current to alternating current conversion apparatus comprising, a plurality of controlled rectifiers each having a conducting and a non-conducting state, each of said controlled rectifiers having an anode-cathode circuit and a triggering electrode, first means changing a direct current to a first frequency alternating current, said state of conduction of each of said plurality of controlled rectifiers being determined by a control circuit comprising a phase shifting network connected with and responsive to said first frequency alternating current from said first means, said first frequency alternating current connected with said anode-cathode circuit of said plurality of controlled rectifiers, a source of second frequency alternating current, a magnetic phase modulator having two load windings and two control windings, said control windings connected in magnetic opposition to each other, said magnetic phase modulator load winding electrically connected to said phase shifting circuits, said control winding connected to said source of second frequency alternating current so that said magnetic phase modulator phase modulates said first frequency alternating current from said phase shifter at said second frequency alternating current, a modulated first frequency alternating current output from said magnetic phase modulator load winding connected to a bistable trigger circuit, said bistable trigger circuit having a steep front amplified output signal at said second frequency, said bistable trigger circuit output connected to said triggering electrodes of said plurality of controlled rectifiers so that said controlled rectifiers are rendered conductive in a predetermined sequence to provide an output voltage at said second frequency.

5. A direct current to alternating current conversion apparatus comprising, a first and a second plurality of controlled rectifiers each having a conducting and a non-conducting state, each of said controlled rectifiers having an anode-cathode circuit and a triggering electrode, said first plurality of controlled rectifiers having control means connected to said triggering electrodes operable to render said first plurality of controlled rectifiers conductive in a predetermined sequence, said anode-cathode circuit of said first plurality of controlled rectifiers providing a three-phase alternating current output at a first frequency, said state of conduction of each of said second plurality of controlled rectifiers controlled by a control circuit comprising a phase shifting circuit connected with each phase of said first frequency three-phase alternating current, said first frequency three-phase alternating current output connected to said anode-cathode circuit of said second plurality of controlled rectifiers, a source of three-phase alternating current signals at a second frequency, a plurality of magnetic phase modulators electrically connected to each of said phase shifting circuits, said source of second frequency three-phase alternating current and said first frequency three-phase alternating current output from said phase shifting circuit connected to said magnetic phase modulator so that said magnetic phase modulator has an alternating current signal output at said first frequency phase modulated by said second frequency, said alternating current output from each of said magnetic phase modulators being connected to at least two of said second plurality of controlled rectifiers so that said second plurality of controlled rectifiers conduct in a predetermined sequence to provide a three-phase alternating current output at said second frequency.

6. A direct current to alternating current conversion apparatus comprising a plurality of controlled rectifiers each having a conducting and a non-conducting state, each of said controlled rectifiers having an anode-cathode circuit and a trigger electrode, first means changing a direct current to a first frequency alternating current, said state of conduction of each of said plurality of controlled rectifiers being determined by a control circuit comprising a phase shifting network connected with and responsive to said first frequency alternating current of said first means, said first frequency alternating current connected with said anode-cathode circuits of said plurality of controlled rectifiers, a source of a second frequency alternating current, a transistor modulating circuit connected to said phase shifting network and said source of second frequency alternating current so that said first frequency alternating current is phase modulated by said second frequency alternating current, said modulated first frequency alternating current connected to said plurality of controlled rectifier trigger electrodes so that said controlled rectifiers are rendered conductive in a predetermined sequence to provide an output voltage at said second frequency.

7. A direct current to alternating current conversion apparatus comprising, a plurality of controlled rectifiers each having a conducting and a non-conducting state, each of said controlled rectifiers having an anode-cathode circuit and a triggering electrode, inverter means changing a direct current to a first frequency alternating current, said state of conduction of each of said plurality of controlled rectifiers being determined by a control circuit comprising a phase shifting network connected with and responsive to said first frequency alternating current from said inverter means, said first frequency alternating current connected with said anode-cathode circuit of said plurality of controlled rectifiers, a source of a second frequency alternating current, a sawtooth generator, said sawtooth generator having an output signal operable to control the conductivity of a first transistor, said source of said second frequency alternating current connected to a second transistor, said first and said second transistor each having an emitter connected to a common point, each of said transistors having a collector connected to an amplifying circuit, an amplified modulated first frequency alternating current output signal from said amplifying circuit connected to said plurality of controlled rectifier triggering electrodes so that said controlled rectifiers are rendered conductive in a predetermined sequence to provide an output voltage at said second frequency.

* * * * *